US012631217B2

(12) United States Patent
Suganuma et al.

(10) Patent No.: US 12,631,217 B2
(45) Date of Patent: May 19, 2026

(54) ROLLING BEARING RING AND MANUFACTURING METHOD THEREFOR

(71) Applicant: NSK LTD., Tokyo (JP)

(72) Inventors: Kentaro Suganuma, Fujisawa (JP); Hiroki Komata, Fujisawa (JP); Daisuke Kobayashi, Fujisawa (JP); Hiroki Shoda, Fujisawa (JP); Haruna Kodama, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/682,723

(22) PCT Filed: May 16, 2023

(86) PCT No.: PCT/JP2023/018265
§ 371 (c)(1),
(2) Date: Feb. 9, 2024

(87) PCT Pub. No.: WO2023/228817
PCT Pub. Date: Nov. 30, 2023

(65) Prior Publication Data
US 2024/0344563 A1     Oct. 17, 2024

(30) Foreign Application Priority Data

May 26, 2022     (JP) ................................. 2022-086088

(51) Int. Cl.
*F16C 33/58*     (2006.01)
*F16C 33/64*     (2006.01)

(52) U.S. Cl.
CPC ............ *F16C 33/64* (2013.01); *F16C 33/585* (2013.01); *F16C 33/586* (2013.01); *F16C 2223/10* (2013.01); *F16C 2223/46* (2013.01)

(58) Field of Classification Search
CPC ...... F16C 33/64; F16C 33/585; F16C 33/586; F16C 2223/10; F16C 2223/46; F16C 2223/14
See application file for complete search history.

(56) References Cited

U.S. PATENT DOCUMENTS 5,418,074 A     5/1995 Grell
2020/0040944 A1 *     2/2020 Sticht .................... F16C 33/583
(Continued)

FOREIGN PATENT DOCUMENTS

EP     0189365 A1 *     7/1986     ............ F16C 33/586
EP     2 458 023 B1     2/2016
(Continued)

OTHER PUBLICATIONS

International Search Report for PCT/JP2023/018265 dated Aug. 8, 2023 (PCT/ISA/210).
(Continued)

*Primary Examiner* — Alan B Waits
(74) *Attorney, Agent, or Firm* — Sughrue Mion, PLLC

(57)     ABSTRACT
A manufacturing method of a rolling bearing ring comprising: a step of obtaining a base member; a step of forming, by laser cladding, a cladded layer made of a metal material having a higher hardness than the base member on one surface of the body member; a step of forming a rolling element guide surface by finishing a surface of the cladded layer; and a step of forming, by laser hardening, a hardened layer over the entire circumference of a surface layer portion of at least a part of the base member that is separated from the cladded layer.

4 Claims, 13 Drawing Sheets

(56) References Cited

U.S. PATENT DOCUMENTS

| | | | | |
|---|---|---|---|---|
| 2022/0145935 A1* | 5/2022 | Baracca | ................. | F16C 33/58 |
| 2022/0213929 A1* | 7/2022 | Tatsumi | ............. | B23K 26/1476 |

FOREIGN PATENT DOCUMENTS

| | | |
|---|---|---|
| JP | 59-47524 A | 3/1984 |
| JP | 2020-190274 A | 11/2020 |

OTHER PUBLICATIONS

Extended European Search Report dated Apr. 2, 2026, issued in European Application No. 23811691.7.

* cited by examiner

ROLLING BEARING RING AND MANUFACTURING METHOD THEREFOR

CROSS REFERENCE TO RELATED APPLICATIONS

This application is a National Stage of International Application No. PCT/JP2023/018265 filed May 16, 2023, claiming priority based on Japanese Patent Application No. 2022-086088 filed May 26, 2022.

TECHNICAL FIELD

The present disclosure relates to a rolling bearing ring and a method of manufacturing the bearing ring.

BACKGROUND ART

Rolling bearings are used as a rotational support device incorporated into various types of mechanical devices.

Among rolling bearings, a radial rolling bearing that mainly supports a radial load includes an outer ring that is a bearing ring having a raceway surface on an inner circumferential surface thereof, an inner ring that is a bearing ring having a raceway surface on an outer circumferential surface thereof, and a plurality of rolling elements that are arranged so as to freely roll between the raceway surfaces of the outer ring and the inner ring. Among rolling bearings, a thrust rolling bearing that mainly supports a thrust load includes a pair of bearing rings that has raceway surfaces on opposite sides in the axial direction, and a plurality of rolling elements that are arranged so as to freely roll between the raceway surfaces of the pair of bearing rings. The raceway surfaces form rolling element guide surfaces that are brought into rolling contact with the rolling elements in order to guide the rolling elements.

In a case where rollers are used as rolling elements, in the radial rolling bearing, the bearing ring of either the outer ring or the inner ring may include a flange portion at a location adjacent in the axial direction to the raceway surface, and an end surface in the axial direction of the rollers may be brought into sliding contact with the flange surface, which is a side surface in the axial direction of the flange portion. In the thrust rolling bearing, one bearing ring of the pair of bearing rings may include a flange portion at a location adjacent in the radial direction to the raceway surface, and an end surface in the axial direction of the rollers may be brought into sliding contact with the flange surface, which is the circumferential surface of the flange portion. The flange surface forms a rolling element guide surface that is brought into sliding contact with the rolling elements in order to guide the rolling elements.

Among the surfaces of the bearing ring, the rolling element guide surface constituted by the raceway surface or the flange surface must have excellent peel life and wear resistance. In order for this, conventionally, the bearing ring has been made of bearing steel, or the bearing ring has been subjected to heat treatment using a heat treatment furnace.

JP 2020-190274 A describes a manufacturing method in which a raceway surface, which is a rolling element guide surface, is formed of a material including a Ni-based alloy in order to improve the wear resistance of the raceway surface in a high-temperature environment. In this manufacturing method, a cladded layer made of a material including a Ni-based alloy, which is harder than the base member, is formed on a circumferential surface of the base member of the bearing ring by laser cladding, and then the surface of the cladded layer is subjected to a grinding process, thereby making the surface a raceway surface.

CITATION LIST

Patent Literature

Patent Literature 1: JP 2020-190274 A

SUMMARY OF INVENTION

Technical Problem

When the bearing ring is made of a hard metal such as high chromium bearing steel that can be made extremely hard by heat treatment in order to provide the rolling element guide surface of the bearing ring with excellent peel life and wear resistance, the material cost of the bearing ring will increase. In addition, the heat treatment is generally performed using a heat treatment furnace, which increases the equipment and operation costs for performing the heat treatment. From the aspect of global environmental protection, there is also a need to reduce the environmental burden caused by heat treatment and the like.

According to the method for manufacturing a bearing ring described in JP 2020-190274 A, even in a case where inexpensive high carbon steel or medium carbon steel is used as the metal material constituting the base member, the cladded layer formed by laser cladding makes it possible to ensure a raceway surface with sufficient hardness. Therefore, the manufacturing cost of the bearing ring can be suppressed, and it is possible to provide the raceway surface with excellent peel life and wear resistance. However, there is a problem in that the hardness of parts other than the raceway surface of the completed bearing ring is not sufficiently ensured.

In other words, of the bearing ring, a circumferential surface on which a rolling element guide surface such as a raceway surface or a flange surface is not formed is used as a fitting surface for a mating circumferential surface such as an inner circumferential surface of a housing or an outer circumferential surface of a rotating shaft. Moreover, a side surface in the axial direction on which the rolling element guide surface is not formed is used as a positioning side surface in the axial direction that comes into contact with a mating side surface provided on a housing, a rotating shaft, or the like. In a case where the fitting surface and positioning side surface do not have sufficient hardness, damage such as fretting wear and dents may easily occur, and it may become difficult to ensure sufficient rotational support performance of the rolling bearing.

By heat-treating the base member on which the raceway surface is formed on the surface of the cladded layer, sufficient hardness can also be ensured for the fitting surface and the positioning side surface. However, not only do the equipment and operation costs for performing the heat treatment increase, but the metal structure of the cladded layer changes due to the heat treatment, and there is a possibility that the desired hardness of the raceway surface will not be obtained.

An object of the technique according to the present disclosure is to provide a rolling bearing ring at a low cost while ensuring sufficient surface hardness not only for the rolling element guide surface but also for predetermined areas outside the rolling element guide surface such as a fitting surface and a positioning side surface.

Solution to Problem

A rolling bearing ring according to an aspect of the present disclosure, includes:

a base member including an outer circumferential surface, an inner circumferential surface, and side surfaces on both sides in an axial direction;

a cladded layer that covers one surface of the outer circumferential surface, the inner circumferential surface, and the side surfaces on both sides in the axial direction;

a rolling element guide surface provided over an entire circumference of a surface of the cladded layer; and a hardened layer formed over the entire circumference of a surface layer portion that includes at least one part of a surface of the base member that is separated from a section covered by the cladded layer;

the hardened layer having higher hardness than a portion of the surface of the base member that is separated from the hardened layer.

A manufacturing method for a rolling bearing ring according to one aspect of the present disclosure, includes:

a step of obtaining the base member;

a step of forming, by laser cladding, the cladded layer made of a metal material having a higher hardness than the portion of the surface of the base member that is separated from the hardened layer, on the one of the outer circumferential surface, the inner circumferential surface, and side surfaces on both sides in the axial direction of the base member;

a step of forming the rolling element guide surface by finishing the surface of the cladded layer; and a step of forming, by laser hardening, the hardened layer over the entire circumference of the surface layer portion that includes the at least one part of the surface of the base member that is separated from the section covered by the cladded layer.

In the rolling bearing ring according to an aspect of the present disclosure, the hardness of the cladded layer is higher than the hardness of the portion of the surface of the base member that is separated from the hardened layer.

The at least one part is a section of the base member that fits with an adjacent mating member during use, and/or a section that comes in contact with an adjacent mating member during use.

The base member may be made of high carbon steel or medium carbon steel.

The cladded layer may be made of at least one type selected from Fe-based alloy, Ni-based alloy, and Co-based alloy.

Effects of Invention

With the rolling bearing ring and the method for manufacturing the same according to an aspect of the present disclosure, the rolling bearing has sufficient surface hardness not only on the rolling element guide surface but also at a predetermined location separated from the rolling element guide surface, and the rolling bearing ring can be obtained at low cost.

BRIEF DESCRIPTION OF DRAWINGS

FIG. 6 is a partial cross-sectional view of an inner ring that is a bearing ring of a sixth example of an embodiment according to the present disclosure.

DESCRIPTION OF EMBODIMENTS

First Example

Figure 1:
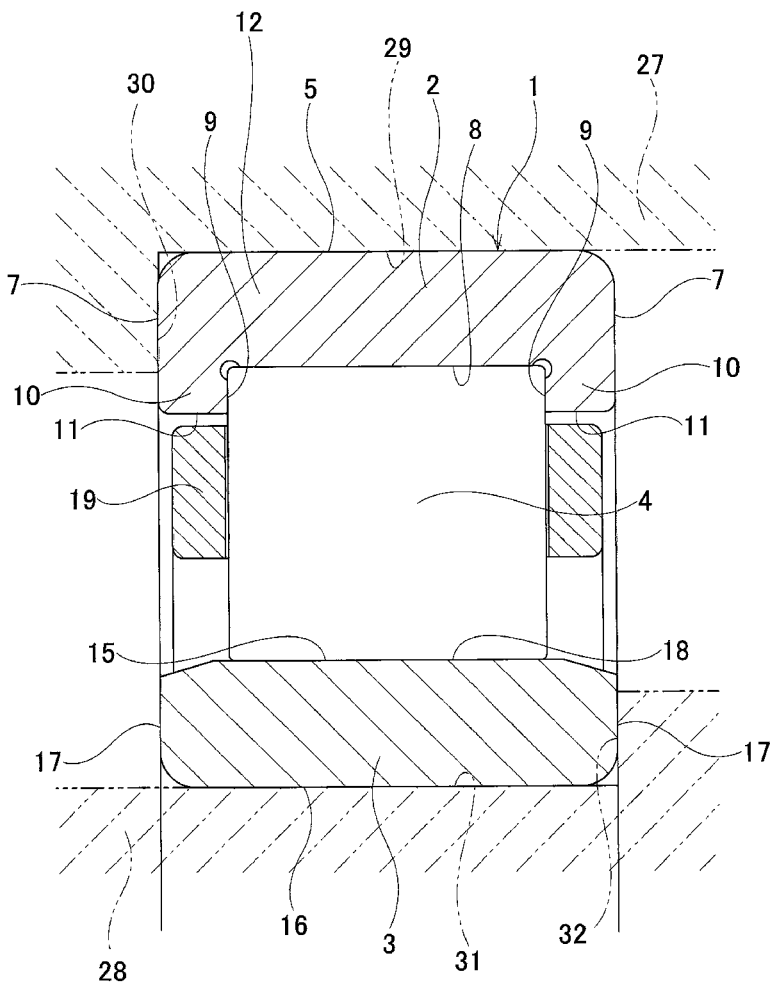
FIG. 1 is a partial cross-sectional view of a rolling bearing including an outer ring that is a bearing ring of a first example of an embodiment according to the present disclosure.

A first example of an embodiment according to the present disclosure will be described using FIG. 1 and FIG. 2A to FIG. 2D.

The rolling bearing 1 is a radial cylindrical roller bearing, and includes an outer ring 2, an inner ring 3, and a plurality of cylindrical rollers 4 as rolling elements. However, the technique according to the present disclosure is applicable not only to bearing rings of radial cylindrical roller bearings, but also to bearing rings of various types of radial rolling bearings, and bearing rings of various types of thrust rolling bearings.

The present example is applied to the outer ring 2 of the rolling bearing 1.

The outer ring 2 includes: a base member 12 having an outer circumferential surface 5, an inner circumferential surface 6, and side surfaces 7 on both sides in the axial direction; cladded layers 13a, 13b that cover one surface of the outer circumferential surface 5, the inner circumferential surface 6, and the side surfaces 7 on both sides in the axial direction; an outer ring raceway surface 8 and a pair of flange surfaces 9 that are rolling element guide surfaces and are provided over the entire circumference of the surfaces of the cladded layers 13a, 13b; and a hardened layer 14 formed over the entire circumference of a surface layer portion that includes at least one part of a surface of the base member 12 that is separated from a section covered by the cladded layer 13*a*, 13*b*. Note that in FIG. 1, the reference signs for the cladded layers 13*a*, 13*b* and the hardened layer 14 and the boundaries between the base member 12, the cladded layers 13*a*, 13*b*, and the hardened layer 14 are omitted.

The base member 12 has an annular shape as a whole, and more specifically, a substantially cylindrical shape, and has a pair of inward facing flange portions 10 that protrudes inward in the radial direction at both ends in the axial direction. The inner circumferential surface 6 of the base member 12 has a recess portion 24 recessed outward in the radial direction in an intermediate portion in the axial direction located between the pair of inward facing flange portions 10. A bottom surface 25 of the recess portion 24 is configured by a cylindrical surface. Side surfaces 26 on both sides in the axial direction of the recess portion 24, that is, mutually opposing side surfaces in the axial direction of the pair of inward facing flange portions 10, are formed by flat surfaces orthogonal to the axial direction.

The inner circumferential surface 11 of the pair of the inward facing flange portions 10 of the base member 12 is configured by a cylindrical surface. The outer circumferential surface 5 of the base member 12 is configured by a cylindrical surface. The side surfaces 7 on both sides in the axial direction of the base member 12 are configured by flat surfaces orthogonal to the axial direction.

In the present example, the base member 12 can be made of a metal material consisting of high carbon steel (SK material) with a carbon content of 0.6% to 2.14%, or medium carbon steel (part of SS material and SC material) with a carbon content of 0.25% to 0.6%.

The cladded layer 13*a* is formed over the entire circumference of the inner circumferential surface 6 of the base member 12 so as to cover the bottom surface 25 of the recess portion 24, and the outer ring raceway surface 8 is formed over the entire circumference on the surface (inner circumferential surface) of the cladded layer 13*a*. In other words, the cladded layer 13*a* constitutes a surface layer portion of the outer ring 2 including the outer ring raceway surface 8.

The cladded layers 13*b* are formed over the entire circumference of the inner circumferential surface 6 of the base member 12 so as to cover side surfaces 26 on both sides in the axial direction of the recess portion 24, and flange surfaces 9 are formed over the entire circumference on the surfaces (side surfaces in the axial direction) of the cladded layers 13*b*. In other words, the cladded layers 13*b* constitute a surface layer portion of the outer ring 2 including the flange surface 9.

The thickness of the cladded layers 13*a*, 13*b* may be 1000 μm or less, and preferably 200 μm or more and 500 μm or less; however, is not limited to this.

The cladded layers 13*a*, 13*b* are made of a metal material, such as a Fe-based alloy, a Ni-based alloy, a Co-based alloy, or the like that has a higher hardness than a portion of the base member 12 that is separated from the hardened layer 14. In this example, the hardness of the cladded layers 13*a*, 13*b* is preferably HRC58 or higher. The hardness of the cladded layers 13*a*, 13*b* is preferably higher than the hardness of the hardened layer 14. However, in a case of embodying the technique according to the present disclosure, the hardness of the cladded layers may be made the same as the hardness of the hardened layer, or may be made lower than the hardness of the hardened layer.

Figures 2A, 2B, 2C, 2D:
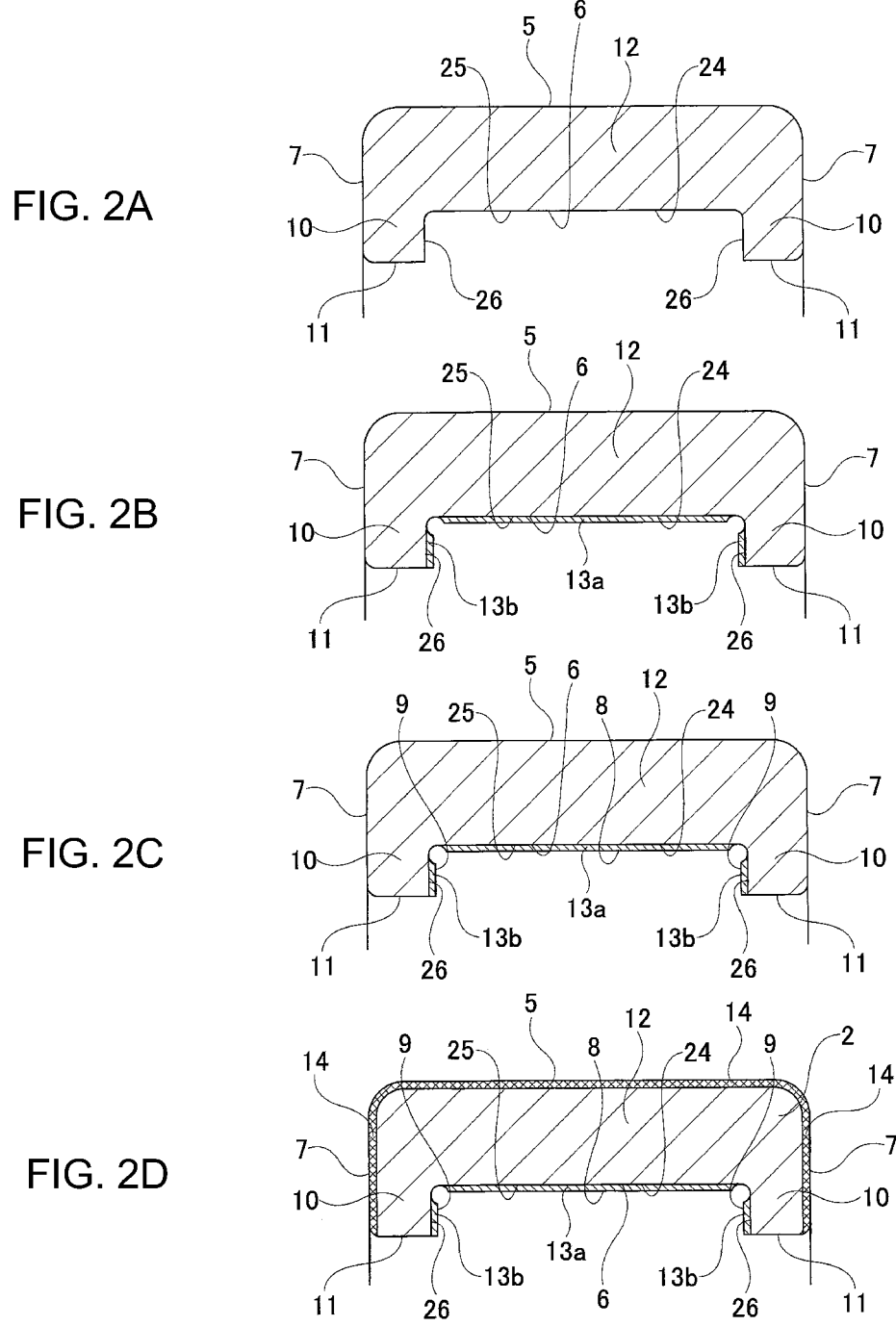
FIGS. 2A to 2D are partial cross-sectional views showing a method for manufacturing the outer ring shown in FIG. 1 in order of steps.

In the present example, the hardened layer 14 is formed over the entire circumference of a surface layer portion that includes at least one part of a surface of the base member 12 of the outer ring 2 that is separated from a section covered by the cladded layers 13*a*, 13*b* (see FIG. 2D). More specifically, the hardened layer 14 is formed over the entire circumference of the surface layer portion of the base member 12 that includes the outer circumferential surface 5 and the side surfaces 7 on both sides in the axial direction. The hardened layer 14 has higher hardness than a portion of the surface of the base member 12 that is separated from the hardened layer 14.

The thickness of the hardened layer 14 may be 1000 μm or less, and preferably 200 μm or more and 500 μm or less; however, is not limited to this.

In a case of embodying the technique according to the present disclosure, the hardened layer 14 can additionally be formed over the entire circumference of a surface layer portion of the base member 12 that includes the inner circumferential surface 11 of the pair of inward facing flange portions 10. Alternatively, the hardened layer 14 may also be formed over the entire circumference of only a surface layer portion of the base member that includes a part of the outer circumferential surface 5, the side surfaces 7 on both sides in the axial direction, and the inner circumferential surfaces 11 of the pair of inward facing flange portions 10.

In the present example, the hardness of the surface of the hardened layer 14 is preferably HRC58 or higher.

The inner ring 3 of the rolling bearing 1 of the present example is made of a hard metal such as bearing steel and has an annular shape as a whole. The inner ring 3 includes an outer circumferential surface 15, an inner circumferential surface 16, and side surfaces 17 on both sides in the axial direction, and has an inner ring raceway surface 18 formed of a cylindrical surface at an intermediate portion in the axial direction of the outer circumferential surface 15.

The plurality of cylindrical rollers 4 are made of hard metal such as bearing steel or ceramic, and are held between the outer ring raceway surface 8 and the inner ring raceway surface 18 by a cylindrical retainer 19 and arranged so as to roll freely. During use, the position in the axial direction of the plurality of cylindrical rollers 4 with respect to the inner ring 3 is regulated by having end surfaces on both sides in the axial direction guided by the pair of flange surfaces 9, and more specifically, by bringing the end surfaces on both sides in the axial direction sliding contact with the pair of flange surfaces 9.

The retainer 19 is made of metal or synthetic resin. The position of the retainer 19 in the radial direction with respect to the outer ring 2 is regulated by having the outer circumferential surfaces of the end portions on both sides in the axial direction guided by the inner circumferential surfaces 11 of the pair of inward facing flange portions 10 of the outer ring 2, and more specifically, by bringing the outer circumferential surfaces of the end portions on both sides in the axial direction sliding contact with the inner circumferential surface 11 of the pair of inward facing flange portions 10 of the outer ring 2. In a case where the retainer 19 is made of metal, in order to improve wear resistance of the inner circumferential surface 11 of the pair of inward facing flange portions 10 that serve as the guide surfaces of the retainer 19, it is preferable that the hardened layer 14 be provided also over the entire circumference of the surface layer portion of the base member 12 including the inner circumferential surface 11.

The rolling bearing 1 of the present example, by being assembled between an outer member 27 and an inner member 28, allows relative rotation between the outer member 27 and the inner member 28, and is able to support a radial load acting between the outer member 27 and the inner member 28. In the present example, the outer circumferential surface 5 of the outer ring 2 can be used as a portion, and more specifically, as a fitting surface, that fits with an inner circumferential surface 29 of the outer member 27, which is an adjacent mating member. At least one of the side surfaces 7 on both sides in the axial direction of the outer ring 2 may be used as a portion, and more specifically, as a side surface for positioning in the axial direction, that comes into contact with a stepped surface 30 or the like provided on the outer member 27.

The inner circumferential surface 16 of the inner ring 3 may be used as a fitting surface that fits with the outer circumferential surface 31 or the like of the inner member 28. At least one of the side surfaces 17 in the axial direction of the inner ring 3 may be used as a positioning side surface in the axial direction that comes into contact with a stepped surface 32 or the like provided on the inner member 28.

A method for manufacturing the outer ring 2, which is the bearing ring of the present example to which this example is applied, includes first to fourth steps.

In the first step, the base member 12 is obtained by performing appropriate processing such as a forging process, a cutting process, or the like on an initial material (not shown) (see FIG. 2A).

In the second step, cladded layers 13*a*, 13*b* are formed on the bottom surface 25 of the recess portion 24 and the side surfaces 26 on both sides in the axial direction of the recess portion 24 of the surface of the base member 12 by laser cladding (see FIG. 2B).

More specifically, a laser is irradiated using a laser device to a part in the circumferential direction of the bottom surface 25 of the recess portion 24 and the side surfaces 26 on both sides in the axial direction, and then the base member 12 is rotated with regard to the laser device while supplying metal material of the cladded layers 13*a*, 13*b*, that is, powder composed of a Fe-based alloy, Ni-based alloy, Co-based alloy, or the like thereto. As a result, the cladded layers 13*a*, 13*b* are formed so as to cover the entire circumference of the bottom surface 25 and the side surfaces 26 on both sides in the axial direction of the recess portion 24.

The cladded layers 13*a*, 13*b* are formed by melting the metal material powder using a laser on the bottom surface 25 and side surfaces 26 on both sides in the axial direction of the recess portion 24, and solidifying the molten metal material by cooling.

The work of forming the three cladded layers 13*a*, 13*b* can be performed one by one in order, or can be performed simultaneously.

In the third step, the surfaces of the cladded layers 13*a*, 13*b* formed in the second step are subjected to finishing processes such as a cutting process, a grinding process, a grinding process, and the like to form the outer ring raceway surface 8 and the pair of flange surfaces 9. (See FIG. 2C).

In the fourth step, by irradiating with a laser to heat, or in other words, laser harden at least one part of a surface of the base member 12 that is separated from the cladded layers 13*a*, 13*b*, more specifically, in the present example, the surface layer portions of the base member 12 including the outer circumferential surface 5 and the side surfaces 7 on both sides in the axial direction, a hardened layer 14 having higher hardness than the metal material of the base member 12 is formed over the entire circumference of the surface layer portions of the base member 12 including the outer circumferential surface 5 and the side surfaces 7 on both sides in the axial direction (see FIG. 2D), finally obtaining the outer ring 2.

In the example illustrated in FIG. 2D, the hardened layer 14 is continuous between the portion of the base member 12 including the outer circumferential surface 5 and the portion that includes the side surfaces 7. However, the hardened layer 14 including the outer circumferential surface 5 and the hardened layer 14 including the side surfaces 7 may be discontinuous.

In a case of embodying the technique according to the present disclosure, the formation of the hardened layer 14 in the fourth step can also be performed before the formation of the cladded layers 13*a*, 13*b* in the second step, or before the finishing process in the third step.

In the present example, an outer ring 2 is obtained at low cost in which, the surface hardness of the outer circumferential surface 5, which is the portion that fits with the adjacent mating member during use, and the side surfaces 7 on both sides in the axial direction, which are the portions that come into contact with the adjacent mating member during use, is sufficiently maintained, in addition to the outer ring raceway surface 8 and the pair of flange surfaces 9 that are the rolling element guide surfaces.

That is, since high carbon steel or medium carbon steel, which are cheaper than bearing steel, can be used as the metal material constituting the base member 12, the outer ring 2 can be obtained at low cost.

In this example, the cladded layers 13*a*, 13*b* are formed on the bottom surface 25 of the recess portion 24 and the side surfaces 26 on both sides in the axial direction of the recess portion 24 on the surface of the base member 12 by laser cladding, and the outer ring raceway surface 8 and the pair of flange surfaces 9 are formed on the surfaces of the cladded layers 13*a*, 13*b*. The cladded layers 13*a*, 13*b* are made of a metal material that is harder than the metal material of the base member 12. Therefore, sufficient surface hardness of the outer ring raceway surface 8 and the pair of flange surfaces 9 is maintained, making it possible for the outer ring raceway surface 8 and the pair of flange surfaces 9, which are rolling element guide surfaces, to have excellent peel life and wear resistance.

In this example, the hardened layer 14 is formed by laser hardening over the entire circumference of the surface layer portion of the base member 12 including the outer circumferential surface 5 and the side surfaces 7 on both sides in the axial direction. Therefore, sufficient surface hardness of the outer circumferential surface 5 and the side surfaces 7 on both sides in the axial direction is maintained, and the outer circumferential surface 5 and the side surfaces 7 on both sides in the axial direction, which are the parts that fit into the adjacent mating member during use and/or the parts that come into contact with the adjacent mating member during use, are provided with excellent wear resistance and scratch resistance.

When forming the hardened layer 14 by laser hardening, only the portion where the hardened layer 14 is to be formed is strongly heated by laser irradiation, so the effects of heat on the cladded layers 13*a*, 13*b* is suppressed. Therefore, the hardness of the outer ring raceway surface 8 and the pair of flange surfaces 9 can be maintained at a desired hardness without changing the metal structure of the cladded layers 13*a*, 13*b*.

In the present example, the hardened layer 14 is formed by laser hardening. Therefore, first, a heat treatment furnace is not required, and environmentally hazardous substances such as $CO_2$ emissions and quenching oil can be significantly reduced. Water washing after quenching, which is associated with the use of quenching oil, is no longer necessary, and water resources can also be conserved. In this way, the environmental load is significantly reduced by the present example.

Second, laser hardening does not require a heat treatment furnace and incidental equipment thereof, and furthermore, water and oil used in heat treatment can be reduced or eliminated. Therefore, the equipment area may be reduced, and equipment for forming the hardened layer 14 may be easily installed.

Thirdly, compared to a heat treatment furnace, the installation cost, running cost, and maintenance cost of equipment can be reduced, so the hardened layer 14 can be formed at low cost.

Note that when the hardened layer 14 is formed by induction hardening, a heating coil corresponding to the size of the outer ring 2 is required, which increases the equipment cost for forming the hardened layer 14. In the present example, since a common laser device can be used regardless of the size of the outer ring 2, the equipment cost for forming the hardened layer 14 can be suppressed.

In the present example, the cladded layers 13a, 13b are formed on the surface layer portion of the outer ring 2, including the outer ring raceway surface 8 and a pair of flange surfaces 9, which are rolling element guide surfaces, and the hardened layer 14 is formed on the surface layer portion of the base member 12 including the outer circumferential surface 5 and the side surfaces 7 on both sides in the axial direction of the surface of the base member 12, which are the parts that fit into the adjacent mating member during use and/or the parts that come into contact with the adjacent mating member during use.

The outer ring raceway surface 8 and the pair of flange surfaces 9 are required to have excellent peel life (fatigue life). Since peeling occurs starting from large inclusions, it is necessary that no large inclusions exist on the outer ring raceway surface 8 and the pair of flange surfaces 9. Since the material used for laser cladding is a powder, there are no large inclusions that would deviate from the particle size distribution, whereas in the base member, which is a common steel type that does not have inclusions controlled, there is a high possibility that inclusions exist. Therefore, in the present example, from the aspect of peeling life, cladded layers 13a, 13b are formed by laser cladding on the surface layer portions of the outer ring 2, including the outer ring raceway surface 8 and the pair of flange surfaces 9. However, since the material of the cladded layers 13a, 13b is more expensive than the base member, the hardened layer 14, which is advantageous in terms of cost, is formed on the surface layer portion of the outer ring 2, including the outer circumferential surface 5 and the side surfaces 7 on both sides in the axial direction, which do not require a long peeling life.

Second Example

Figure 3:
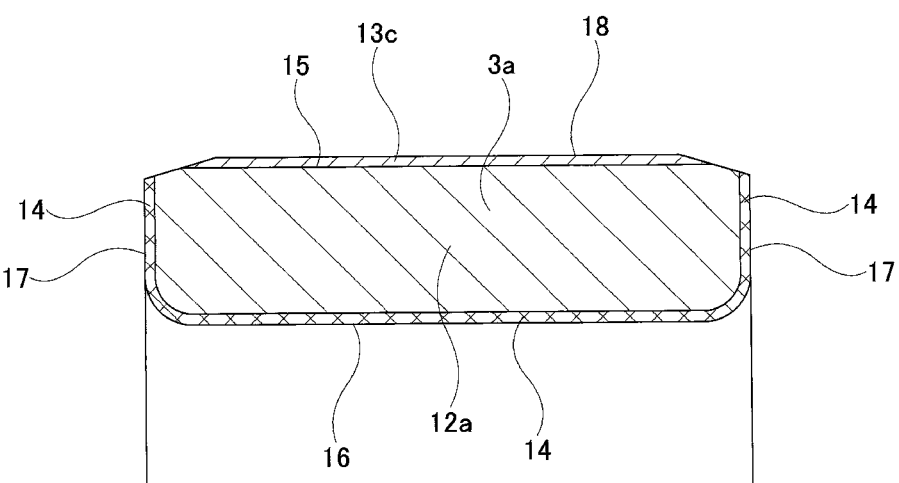
FIG. 3 is a partial cross-sectional view illustrating an inner ring that is a bearing ring of a second example of an embodiment according to the present disclosure.

A second example of an embodiment according to the present disclosure will be described using FIG. 3.

The present example is applied to an inner ring 3a of a radial cylindrical roller bearing.

The inner ring 3a has a base member 12a that is entirely annular, more specifically, substantially cylindrical. The base member 12a has four surfaces including an outer circumferential surface 15, an inner circumferential surface 16, and side surfaces 17 on both sides in the axial direction.

The inner ring 3a includes a cladded layer 13c that covers the outer circumferential surface 15 of the four surfaces of the base member 12a. An inner ring raceway surface 18, which is a rolling guide surface, is formed on the surface of the cladded layer 13c.

In the present example, a hardened layer 14 is formed over the entire circumference of a surface layer portion that includes at least one part of a surface of the base member 12a of the inner ring 3a that is separated from a section covered by the cladded layer 13c. More specifically, the hardened layer 14 is formed over the entire circumference of the surface layer portion of the base member 12a, including the inner circumferential surface 16 and the side surfaces 17 on both sides in the axial direction.

The method for manufacturing the inner ring 3a of the present example includes, as in the first example, a step of obtaining a base member 12a, a step of forming a cladded layer 13c by laser cladding on a portion covering the outer circumferential surface 15 of the base member 12a, a step of forming the inner ring raceway surface 18 by finishing a surface of the cladded layer 13c, and a step of forming, by laser hardening, the hardened layer 14 over the entire circumference of the surface layer portion of the base member 12a including the inner circumferential surface 16 and the side surfaces 17 on both sides in the axial direction. Other configurations and effects are the same as in the first example.

Third Example

A third example of an embodiment according to the present disclosure will be described using FIG. 4 and FIG. 5.

The rolling bearing 1a is a radial conical roller bearing, and includes an outer ring 2a, an inner ring 3b, and a plurality of conical rollers 20 that are rolling elements.

The present example is applied to the outer ring 2a of the rolling bearing 1a.

The outer ring 2a has a base member 12b that is entirely annular, and more specifically, substantially cylindrical. The base member 12b has four surfaces including an outer circumferential surface 5a, an inner circumferential surface 6a, and side surfaces 7a, 7b on both sides in the axial direction. The outer ring 2a includes a cladded layer 13d that covers the inner circumferential surface 6a of the four surfaces of the base member 12b. An outer ring raceway surface 8a is provided over the entire circumference on the surface of the cladded layer 13d. In the present example, a rolling element guide surface of the outer ring 2a is configured by the outer ring raceway surface 8a.

Figure 4:
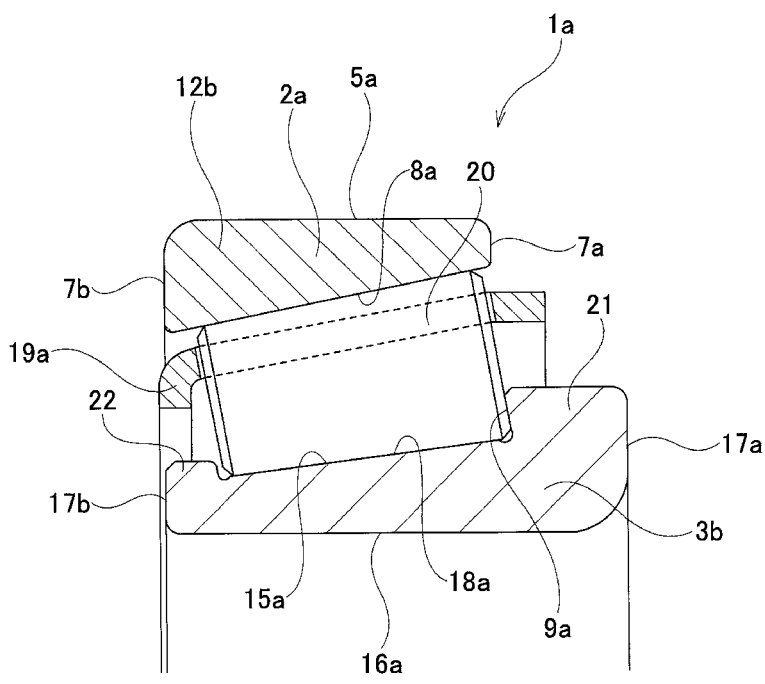
FIG. 4 is a partial cross-sectional view of a rolling bearing including an outer ring that is a bearing ring of a third example of an embodiment according to the present disclosure.
Figure 5:
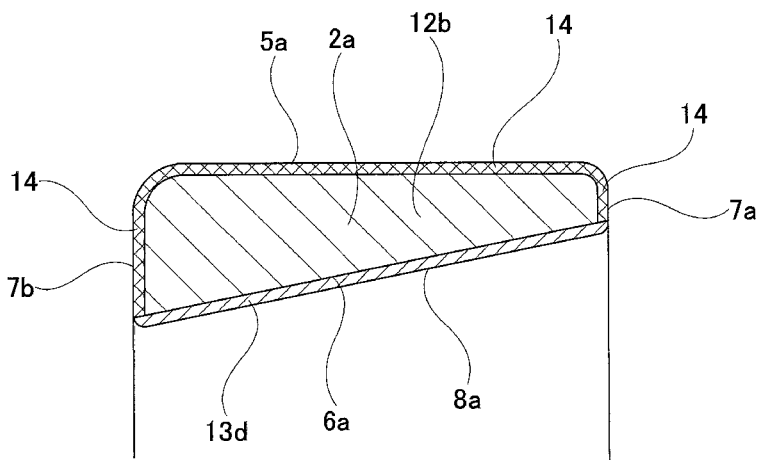
FIG. 5 is a partial cross-sectional view of the outer ring illustrated in FIG. 4.

The outer ring raceway surface 8a is configured by a conical surface inclined in a direction in which the diameter increases as going toward one side in the axial direction (the right side in FIG. 4 and FIG. 5).

The outer circumferential surface 5a of the base member 12b is configured by a cylindrical surface. The side surfaces 7a, 7b on both sides in the axial direction of the base member 12b are configured by flat surfaces that are orthogonal to the axial direction.

In the present example, a hardened layer 14 is formed over the entire circumference of a surface layer portion that includes at least one part of a surface of the base member 12b of the outer ring 2a that is separated from a section covered by the cladded layer 13d. More specifically, the hardened layer 14 is formed over the entire circumference of the surface layer portion of the base member 12b including the outer circumferential surface 5a and the side surfaces 7a, 7b on both sides in the axial direction.

The inner ring 3b of the rolling bearing 1a of the present example is made of a hard metal such as bearing steel and has an annular shape as a whole. The inner ring 3b includes an outer circumferential surface 15a, an inner circumferential surface 16a, and side surfaces 17a, 17b on both sides in the axial direction, and has an inner ring raceway surface 18a and a flange surface 9a at an intermediate portion in the axial direction of the outer circumferential surface 15a. The inner ring raceway surface 18a is configured by a conical surface inclined in a direction in which the diameter increases toward the one side in the axial direction (the right side in FIG. 4 and FIG. 5).

The inner ring 3b has a large flange portion 21 that protrudes outward in the radial direction at an end portion on a large diameter side adjacent to a large diameter side of the inner ring raceway surface 18a, and has a small flange portion 22 that protrudes outward in the radial direction at an end portion on a small diameter side adjacent to a small diameter side of the inner ring raceway surface 18a. The flange surface 9a is provided on a side surface of the large flange portion 21 on the inner ring raceway surface 18a side in the axial direction. The flange surface 9a is configured by a conical surface that is inclined toward the other side in the axial direction (the left side in FIG. 4 and FIG. 5) as going outward in the radial direction.

The inner circumferential surface 16a of the inner ring 3b is configured by a cylindrical surface. The side surfaces 17a, 17b on both sides in the axial direction of the inner ring 3b are configured by flat surfaces that are orthogonal to the axial direction.

The plurality of conical rollers 20 are made of hard metal such as bearing steel or ceramic, and are arranged between the outer ring raceway surface 8a and the inner ring raceway surface 18a so as to roll freely while being held by a retainer 19a. During use, the position in the axial direction of the plurality of conical rollers 20 with respect to the inner ring 3b is regulated by guiding the large-diameter end surfaces by the flange surface 9a, and more specifically by bringing the large-diameter end surfaces into sliding contact with the flange surface 9a.

The retainer 19a is made of metal or synthetic resin. The position in the radial direction of the retainer 19a with respect to the outer ring 2a is regulated by guiding the outer circumferential surfaces of column portions by the outer ring raceway surface 8a, and more specifically by bringing the outer circumferential surfaces of the column portions into sliding contact with the outer ring raceway surface 8a.

The method for manufacturing the outer ring 2a of the present example, as in the first example, includes: a step of obtaining the base member 12b; a step of forming a cladded layer 13d by laser cladding on a portion covering the inner circumferential surface 6a of the base member 12b; a step of forming the outer ring raceway surface 8a by finishing the surface of the cladded layer 13d; and a step of forming a hardened layer 14, by laser hardening, over the entire circumference of a surface layer portion of the base member 12b including the outer circumferential surface 5a and the side surfaces 7a and 7b on both sides in the axial direction. Other configurations and effects are the same as in the first example.

Fourth Example

Figure 6:
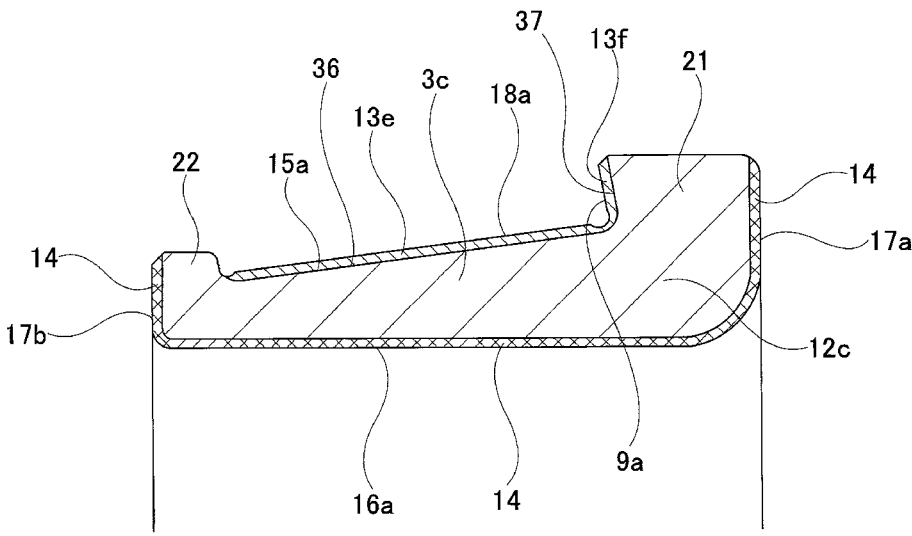
FIG. 6 is a partial cross-sectional view of an inner ring that is a bearing ring of a fourth example of an embodiment according to the present disclosure.

A fourth example of an embodiment according to the present disclosure will be described using FIG. 6.

The present example is applied to an inner ring 3c of a radial conical roller bearing.

The inner ring 3c has a base member 12c that is entirely annular and made of a metal material such as high carbon steel or medium carbon steel.

The base member 12c has four surfaces including an outer circumferential surface 15a, an inner circumferential surface 16a, and side surfaces 17a, 17b on both sides in the axial direction, and has an inclined circumferential surface 36 and an inclined side surface 37 at an intermediate portion in the axial direction of the outer circumferential surface 15a. The inclined circumferential surface 36 is configured by a conical surface inclined in a direction in which the diameter increases as going toward one side in the axial direction (right side in FIG. 6).

The base member 12c has a large flange portion 21 that protrudes outward in the radial direction at an end portion on the large diameter side adjacent to the large diameter side of the inclined circumferential surface 36, and has a small flange portion 22 adjacent to the outside in the radial direction at a small diameter end portion adjacent to the small diameter side of the inclined circumferential surface 36. The inclined side surface 37 is provided on the side surface on the inclined circumferential surface 36 side in the axial direction of the large flange portion 21. The inclined side surface 37 is configured by a conical surface that is inclined toward the other axial side (left side in FIG. 6) as going outward in the radial direction.

The inner ring 3c includes a cladded layer 13c that covers the inclined circumferential surface 36 and a cladded layer 13f that covers the inclined side surface 37. An inner ring raceway surface 18a is formed on the surface of the cladded layer 13e, and a flange surface 9a is formed on the surface of the cladded layer 13f.

In the present example, a hardened layer 14 is formed over the entire circumference of a surface layer portion that includes at least one part of a surface of the base member 12c of the inner ring 3c that is separated from a section covered by the cladded layers 13c, 13f. More specifically, the hardened layer 14 is formed over the entire circumference of the surface layer portion of the base member 12c including the inner circumferential surface 16a and the side surfaces 17a, 17b on both sides in the axial direction.

The method for manufacturing the inner ring 3c of the present example, as in the first example, includes: a step of obtaining the base member 12c; a step of forming cladded layers 13c, 13f by laser cladding on portions including the inclined circumferential surface 36 and the inclined side surface 37 of the base member 12c; a step of forming an inner ring raceway surface 18a and a flange surface 9a by finishing the surfaces of the cladded layers 13e, 13f; and a step of forming a hardened layer 14 over the entire circumference by laser hardening on the surface layer portion of the base member 12 including the inner circumferential surface 16a and the side surfaces 17a, 17b on both sides in the axial direction of the surface of the base member 12c. Other configurations and effects are the same as in the first example and third example.

Fifth Example

Figure 7:
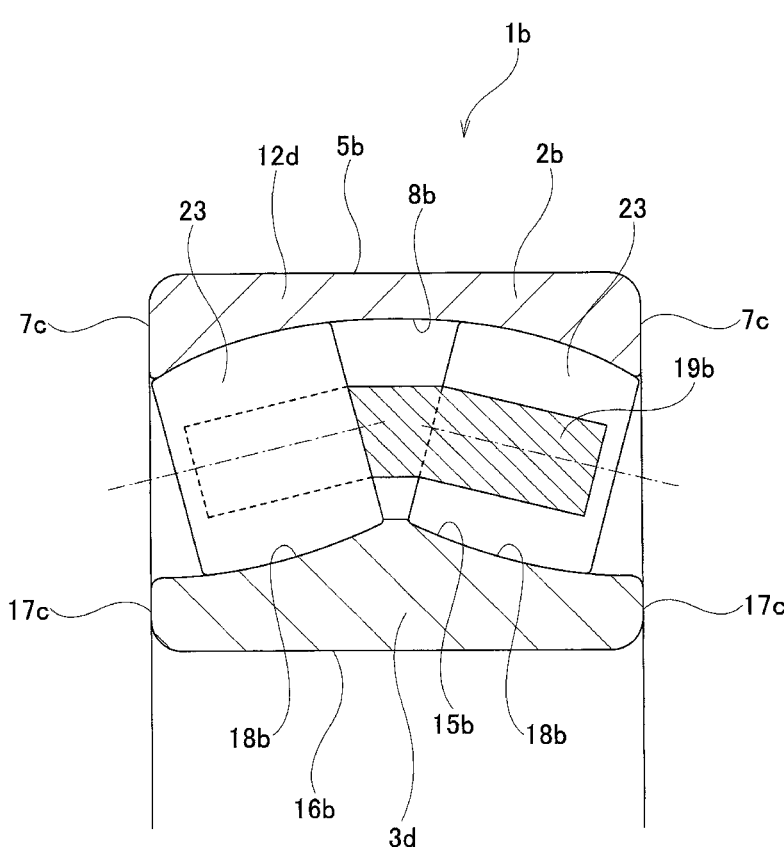
FIG. 7 is a partial cross-sectional view of a rolling bearing including an outer ring that is a bearing ring of a fifth example of an embodiment according to the present disclosure.
Figure 8:
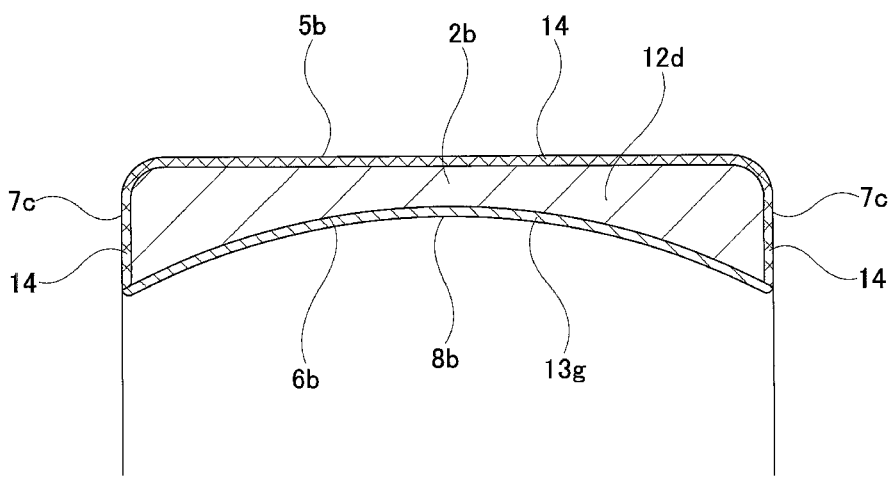
FIG. 8 is a partial cross-sectional view of the outer ring illustrated in FIG. 7.

A fifth example of an embodiment according to the present disclosure will be described using FIG. 7 and FIG. 8.

A rolling bearing 1b is a self-aligning roller bearing, and includes an outer ring 2b, an inner ring 3d, and a plurality of spherical rollers 23 as rolling elements.

The present example is applied to the outer ring 2b of the rolling bearing 1b.

The outer ring 2b has a base member 12d and a cladded layer 13g. The base member 12d has an annular shape as a whole, and more specifically, a substantially cylindrical shape, and includes four surfaces including an outer circumferential surface 5b, an inner circumferential surface 6b, and side surfaces 7c on both sides in the axial direction. The cladded layer 13g is provided over the entire circumference so as to cover the inner circumferential surface 6b of the base member 12d. An outer ring raceway surface 8b is provided over the entire circumference on the surface of the cladded layer 13g. The outer ring raceway surface 8b is configured by a spherical concave surface having a single center. In the present example, a rolling element guide surface of the outer ring 2b is configured by the outer ring raceway surface 8b.

The outer circumferential surface 5b of the base member 12d is configured by a cylindrical surface. The side surfaces 7c on both sides in the axial direction of the base member 12d are configured by flat surfaces that are orthogonal to the axial direction.

In the present example, a hardened layer 14 is formed over the entire circumference of a surface layer portion that includes at least one part on a surface of the base member 12d of the outer ring 2b that is separated from a section covered by the cladded layer 13g. More specifically, the hardened layer 14 is formed over the entire circumference of the surface layer portion of the base member 12d including the outer circumferential surface 5b and the side surfaces 7c on both sides in the axial direction.

The inner ring 3d of the rolling bearing 1b of the present example is made of a hard metal such as bearing steel and has an annular shape as a whole. The inner ring 3d includes an outer circumferential surface 15b, an inner circumferential surface 16b, and side surfaces 17c on both sides in the axial direction, and has a double-row inner ring raceway surface 18b on the outer circumferential surface 15b. Each row of the double-row inner ring raceway surface 18b has an arc-shaped cross-sectional shape.

The inner circumferential surface 16b of the inner ring 3d is configured by a cylindrical surface. The side surfaces 17c on both sides in the axial direction of the inner ring 3d are configured by flat surfaces that are orthogonal to the axial direction.

The spherical rollers 23 are made of hard metal such as bearing steel or ceramic, and with a plurality of spherical rollers being held in each row by a metal or synthetic resin retainer 19b, the spherical rollers are arranged so as to freely roll between the outer ring raceway surface 8b and the double-row inner ring raceway surface 18b.

The method for manufacturing the outer ring 2b of the present example, as in the first example, includes: a step of obtaining the base member 12d; a step of forming a cladded layer 13g by laser cladding on a portion including the inner circumferential surface 6b of the base member 12d; a step of forming the outer ring raceway surface 8b by finishing the surface of the cladded layer 13g; and a step of forming a hardened layer 14, by laser hardening, over the entire circumference of the surface layer portion of the base member 12d including the outer circumferential surface 5b and the side surfaces 7c on both sides in the axial direction of the surface of the base member 12d. Other configurations and effects are the same as in the first example.

Sixth Example

Figure 9:
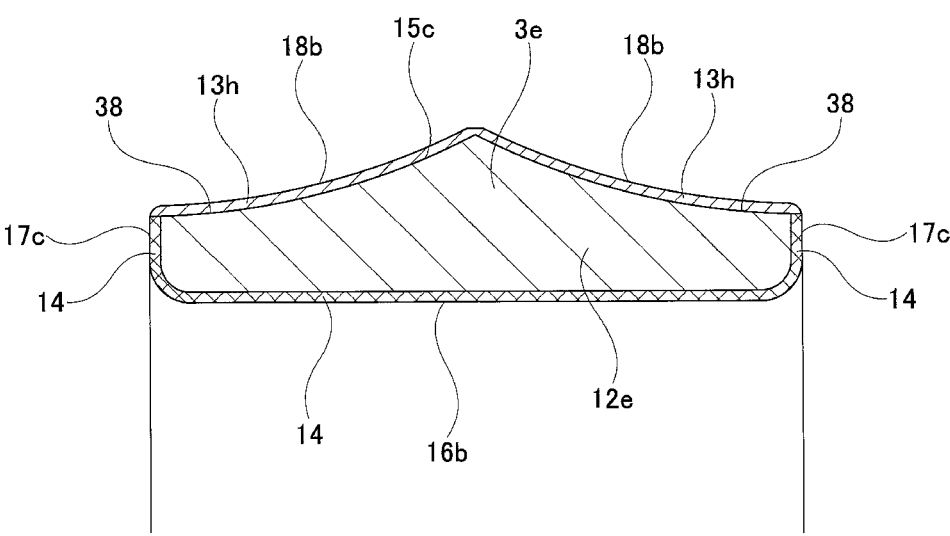

A sixth example of an embodiment according to the present disclosure will be described using FIG. 9.

This present example is applied to an inner ring 3e of a self-aligning roller bearing.

The inner ring 3e has a base member 12e and cladded layers 13h. The base member 12c has an annular shape as a whole made of a metal material such as high carbon steel or medium carbon steel, and includes an outer circumferential surface 15c, an inner circumferential surface 16b, and side surfaces 17c on both sides in the axial direction. The outer circumferential surface 15c has a pair of concave curved surfaces 38 on both side portions in the axial direction, each having an arc-shaped generatrix shape with a diameter that decreases as the distance from each other in the axial direction increases. The cladded layers 13h are provided over the entire circumference so as to cover the pair of concave curved surfaces 38. An inner ring raceway surface 18b is provided over the entire circumference on the surface of each cladded layer 13h. In this example, the rolling element guide surface of the inner ring 3e is configured by a double-row inner ring raceway surface 18b.

In the present example, a hardened layer 14 is formed over the entire circumference of a surface layer portion that includes at least one part of the surface of the base member 12e of the inner ring 3e and that is separated from the section covered by the cladded layer 13h. More specifically, the hardened layer 14 is formed over the entire circumference of the surface layer portion of the base member 12e including the inner circumferential surface 16b and the side surfaces 17c on both sides in the axial direction.

The method for manufacturing the inner ring 3e of the present example, as in the first example, includes: a step of obtaining the base member 12e; a step of forming cladded layers 13h by laser cladding on portions including the outer circumferential surface 15c of the base member 12e; a step of forming a double-row inner ring raceway surface 18b by finishing the surfaces of the cladded layers 13h; and a step of forming a hardened layer 14 over the entire circumference of the surface of the base member 12e by laser hardening, including the inner circumferential surface 16b and the side surfaces 17c on both sides in the axial direction. Other configurations and effects are the same as in the first example and fifth example.

Although embodiments according to the present disclosure have been described above, the embodiments according to the present disclosure are not limited thereto and may be modified as appropriate without departing from the technical idea of the present disclosure.

The technique according to the present disclosure can be applied to bearing rings of various radial rolling bearings, including deep groove ball bearings, angular contact ball bearings, cylindrical roller bearings, needle bearings, conical roller bearings, and spherical roller bearings, as well as bearing rings of thrust rolling bearings.

EXAMPLES

The effects of the rolling bearing ring and the manufacturing method thereof according to the present disclosure were verified. More specifically, Sample A (Example) including a bearing ring in which a hardened layer is formed by laser hardening on a portion of the surface of the base member that is separated from the section covered by the cladded layer, and Sample B (Comparative Example) including a bearing ring in which a hardened layer is not formed by laser hardening on the surface of the base member separated from the section covered by the cladded layers are prepared, and for each of Samples A and B, the scratch resistance of the portion separated from the section covered by the cladded layer was confirmed.

(Samples A and B)

Figures 10A, 10B:
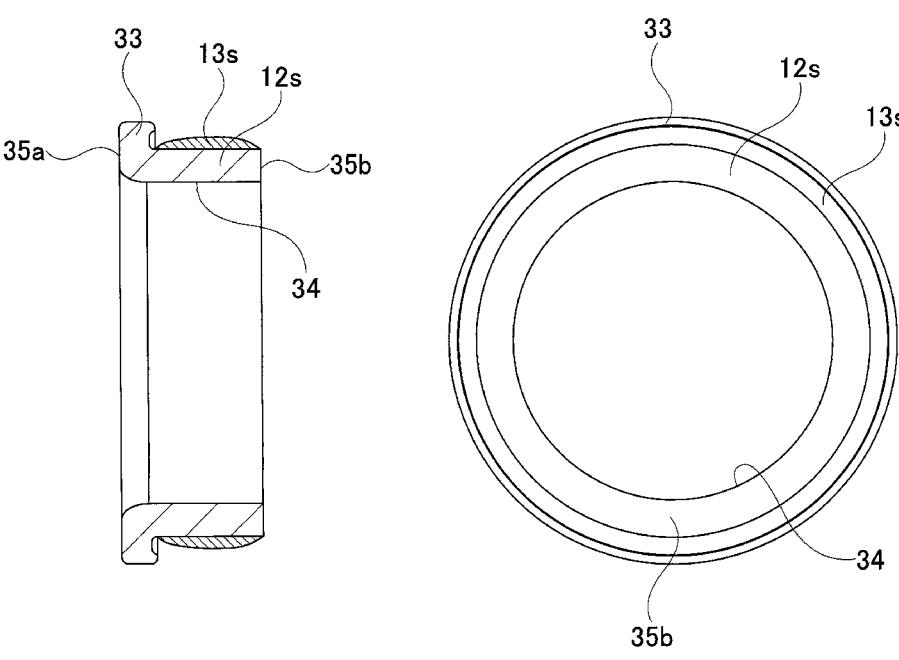
FIG. 10A is a cross-sectional view of a bearing ring subjected to testing to verify the effects according to the present disclosure.
FIG. 10B is a cross-sectional view of the bearing ring viewed from the right side of FIG. 10A.

Both Sample A (Example) and Sample B (Comparative Example), as illustrated in FIGS. 10A and 10B, have an overall shape that resembles an inner ring of a radial cylindrical roller bearing, and includes an outward facing flange portion 33 at the end portion on one side in the axial direction (left side in FIG. 10A). Samples A and B both include a base member 12s made of SUJ2, and cladded layer 13s that covers a section of the outer circumferential surface of the base member 12s that is separated in the axial direction from the outward facing flange portion 33. The cladded layer 13s is formed by laser cladding using M2 material equivalent to high-speed steel.

Sample A includes a hardened layer formed by laser hardening over the entire circumference of the inner circumferential surface 34 and side surfaces 35a, 35b on both sides in the axial direction of the base member 12s. Sample B does not include a hardened layer. In both Samples A and B, the inner circumferential surface 34 of the base member 12s and the side surfaces 35a, 35b on both sides in the axial direction are finished to predetermined dimensions by grinding. However, since the purpose of this experiment was to confirm the scratch resistance of the portions separated from the section covered by the cladded layers 13s, no finishing processing was performed on the surface of the cladded layer 13s.

(Evaluation Method)

Samples A and B were fitted onto an outer circumferential surface of a cylindrical test shaft with interference, and then testing was performed in which the test shaft was pulled out from inside of the Samples A and B, and the scratch resistance was evaluated based on the presence or absence of scratches and the degree of the scratches on the inner circumferential surface 34. Note that in order to set severe test conditions, the outer circumferential surface of the test shaft was made of a rough surface where fretting occurred.

More specifically, tests and evaluations were conducted in the following order (1) to (5).

(1) The sample is heated and thermally expanded to the extent that a sufficient gap occurs between the inner circumferential surface 34 of the sample and the outer circumferential surface of the test shaft.

(2) The test shaft is inserted inside the heated sample.

(3) The sample and the test shaft are cooled to room temperature and heat-shrunk, whereby the sample is fitted onto the outer circumferential surface of the test shaft with interference.

(4) While supporting an entire side surface 35a of the sample on one side in the axial direction by a hollow disc-shaped spacer disposed adjacent to the one side in the axial direction of the sample, the test shaft is pulled out from inside the sample and the spacer toward the one side in the axial direction.

(5) After the test shaft has been pulled out, whether or not there are any scratches on the inner circumferential surface 34 of the sample due to pulling out the test shaft, and the extent of the scratches that have occurred is checked.

The diameter dimension (average value) of the inner circumferential surface 34 of Samples A and B at room temperature was 29.996 mm, the diameter dimension (average value) of the outer circumferential surface of the test shaft at room temperature was 30.029 mm, and the interference (calculated value) at the fitting portion between the inner circumferential surface 34 of Samples A and B and the outer circumferential surface of the test shaft was 0.033 mm.

(Evaluation Results 1: Appearance Evaluation Results)

Figure 11:
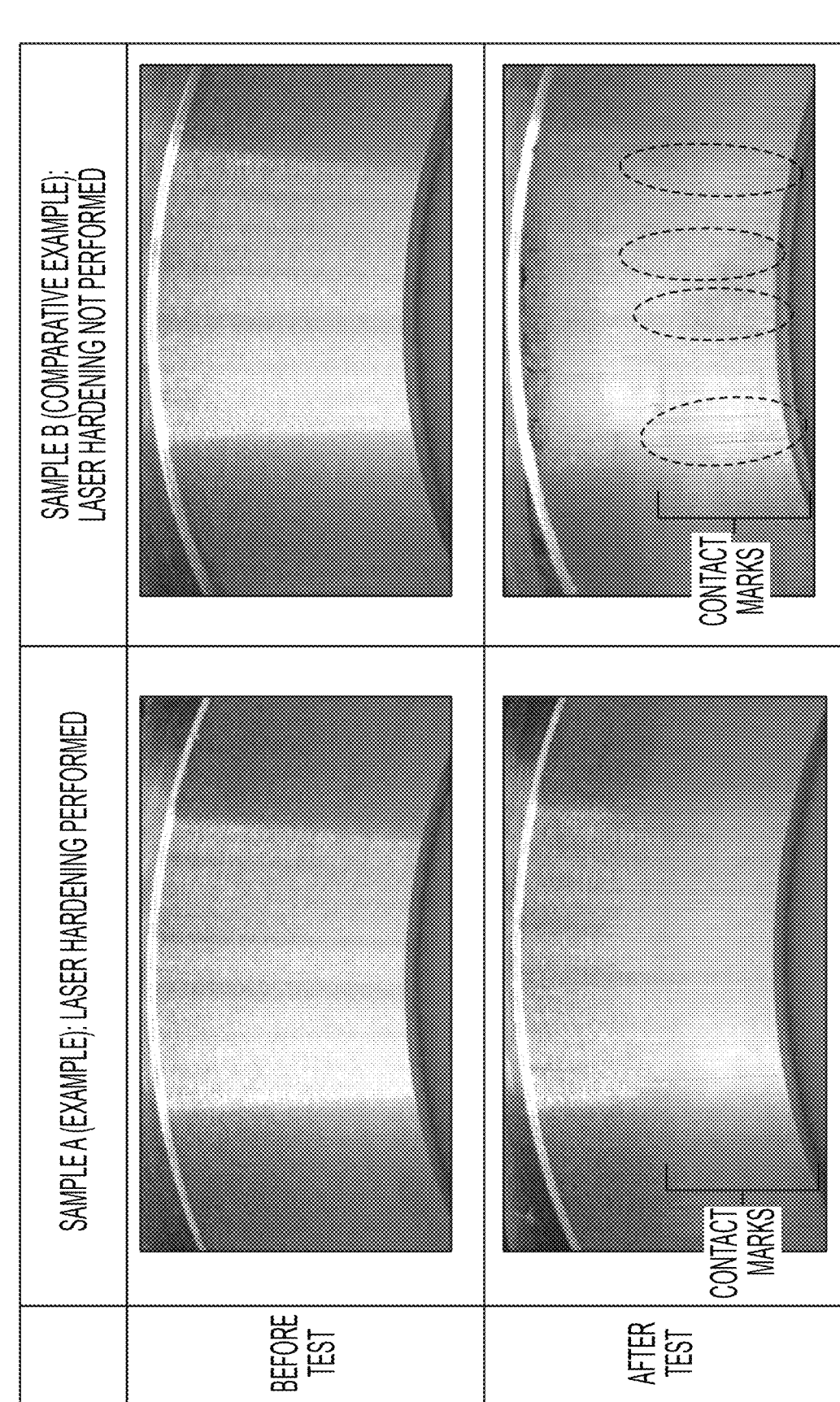
FIG. 11 is a diagram showing appearance evaluation results for a Sample A (Example) and a Sample B (Comparative Example).

For Samples A and B, the state of the inner circumferential surface 34 before and after the test was observed using a microscope. The observation results are shown in FIG. 11.

In Sample B (Comparative Example), many streak-like scratches extending in the axial direction were visually recognized on the inner circumferential surface 34. On the other hand, in Sample A (Example) having a hardened layer, almost no streak-like scratches extending in the axial direction were visually recognized on the inner circumferential surface 34.

(Evaluation Results 2: Evaluation Results of Degree of Damage)

Figure 12:
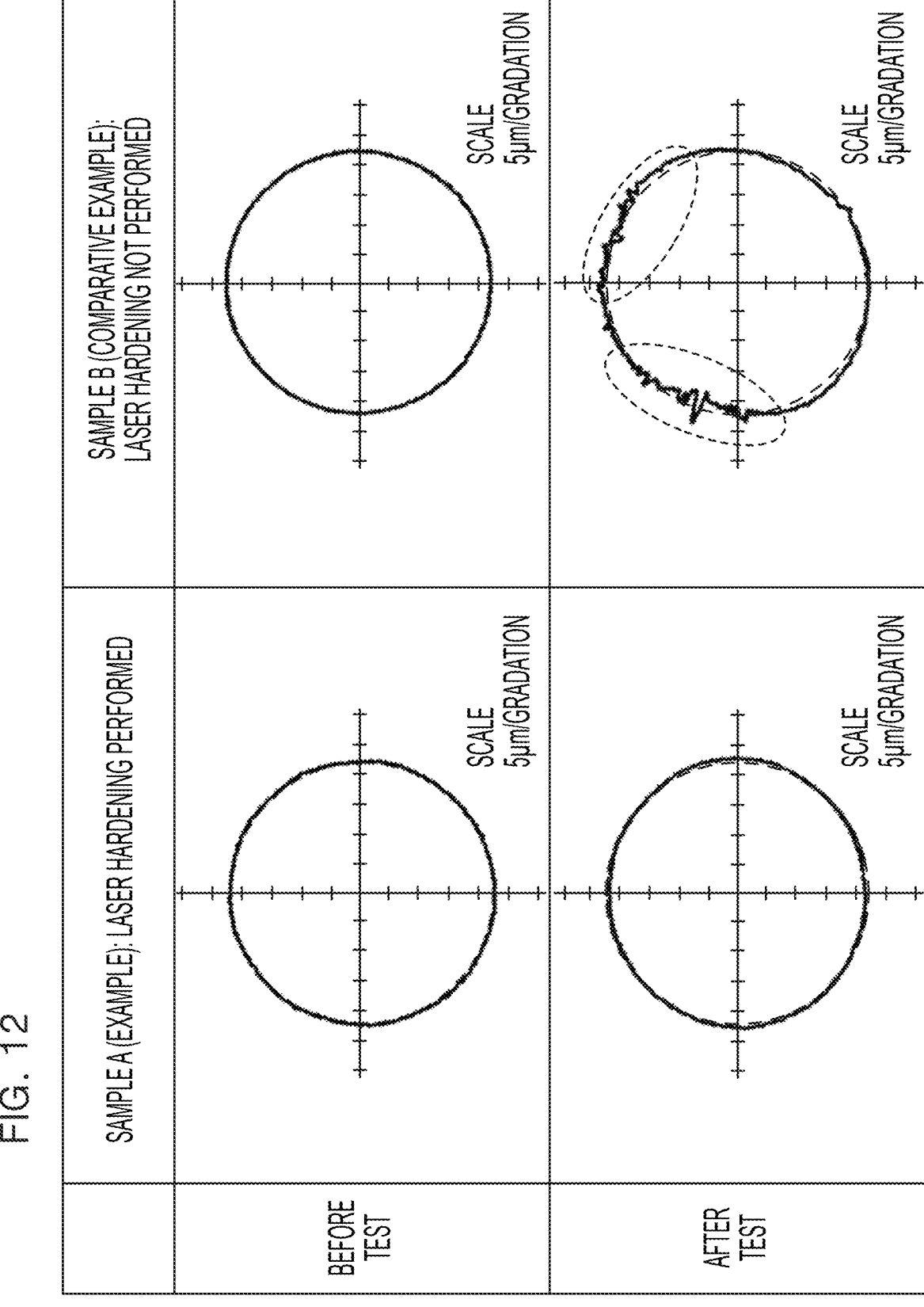
FIG. 12 is a diagram showing evaluation results of the degree of scratches for Sample A (Example) and Sample B (Comparative Example).

For Samples A and B, circumferential unevenness of the inner circumferential surface 34 before and after the test was measured using a roundness measuring device. The measurement results are shown in FIG. 12.

As shown in the measurement results, in Sample B (Comparative Example), unevenness in the circumferential direction was observed in a portion in the circumferential direction of the inner circumferential surface 34 (portion surrounded by the broken line). In contrast, in Sample A (Example) having a hardened layer, substantially no unevenness in the circumferential direction was observed on the inner circumferential surface 34.

(Evaluation Results 3: Evaluation Results of Shape Collapse)

Figure 13:
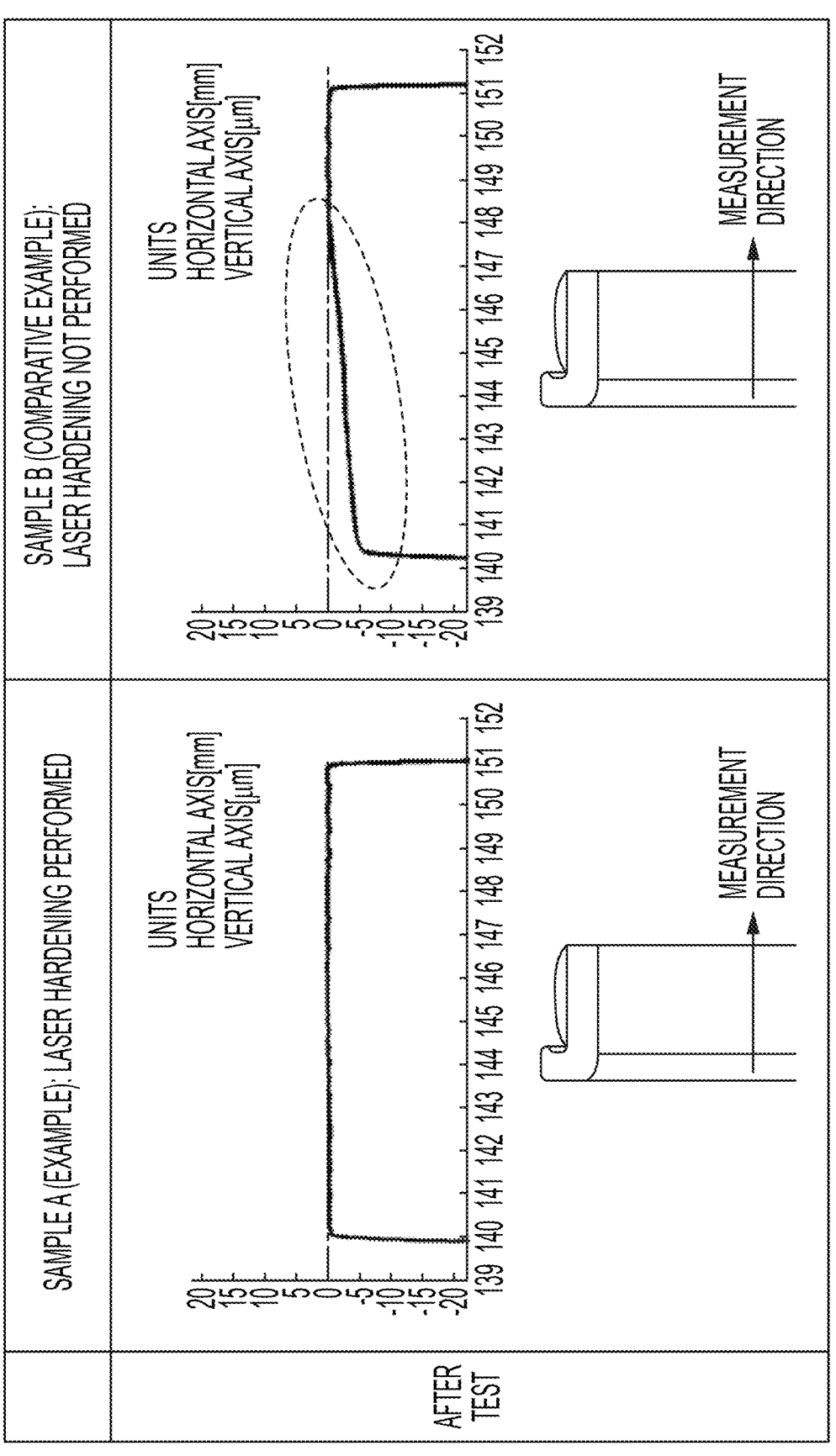
FIG. 13 is a diagram showing evaluation results of shape collapse for Sample A (Example) and Sample B (Comparative Example).

For Samples A and B, the linear shape (shape in the axial direction) of the inner circumferential surface 34 before and after the test was measured using a straightness measuring device. The measurement results are shown in FIG. 13.

As shown in the measurement results, in Sample B (Comparative Example), an inclined deformation in which the radial height changes in the axial direction was confirmed in a portion in the axial direction of the inner circumferential surface 34 (the portion surrounded by the broken line). On the other hand, in Sample A (Example) having a hardened layer, substantially no inclined deformation in which the radial height changes in the axial direction was observed on the inner circumferential surface 34.

(Summary of Evaluation Results)

As mentioned above, it was confirmed that depending on whether or not a hardened layer is formed on a part of the surface of the base member that is separated from the section covered by the cladded layer, there is a difference in the scratch resistance of that part, and when the hardened layer was formed, scratches were less likely to occur. In addition, it was confirmed that resistance was ensured not only against scratches but also against deformation of the linear shape of the circumferential surface fitted to the mating member.

REFERENCE SIGNS LIST

1, 1a, 1b Rolling bearing
2, 2a, 2b Outer ring
3, 3a, 3b, 3c, 3d, 3e Inner ring
4 Cylindrical roller
5, 5a, 5b Outer circumferential surface
6, 6a, 6b Inner circumferential surface
7, 7a, 7b, 7c Side surface
8, 8a, 8b Outer ring raceway surface
9, 9a Flange surface
10 Inward facing flange portion
11 Inner circumferential surface
12, 12a, 12b, 12c, 12d, 12e, 12s Base member
13a, 13b, 13c, 13d, 13e, 13f, 13g, 13h, 13s Cladded layer
14 Hardened layer
15, 15a, 15b Outer circumferential surface

16, 16a, 16b Inner circumferential surface
17, 17a, 17b, 17c Side surface
18, 18a, 18b Inner ring raceway surface
19, 19a, 19b Retainer
20 Conical roller
21 Large flange portion
22 Small flange portion
23 Spherical roller
24 Recess portion
25 Bottom surface
26 Side surface
27 Outer member
28 Inner member
29 Inner circumferential surface
30 Stepped surface
31 Outer circumferential surface
32 Stepped surface
33 Outward facing flange portion
34 Inner circumferential surface
35a, 35b Side surface
36 Inclined circumferential surface
37 Inclined side surface
38 Concave curved surface

The invention claimed is:

1. A manufacturing method for a rolling bearing ring, the rolling bearing ring comprising:

a base member including an outer circumferential surface, an inner circumferential surface, and side surfaces on both sides in an axial direction;

a cladded layer that covers one surface of the outer circumferential surface, the inner circumferential surface, and the side surfaces on both sides in the axial direction;

a rolling element guide surface provided over an entire circumference of a surface of the cladded layer, the rolling element guide surface formed by at least a part of the surface of the cladded layer; and a hardened layer formed over the entire circumference of a surface layer portion that includes at least one part of a surface of the base member that is separated from a section covered by the cladded layer;

the base member made of high carbon steel or medium carbon steel; and the cladded layer made of at least one type selected from Fe-based alloy, Ni-based alloy, and Co-based alloy, and having a hardness higher than the portion of the surface of the base member that is separated from the hardened layer and equal or lower than the hardened layer;

the manufacturing method comprising:

a step of obtaining the base member;

a step of forming, by laser cladding, the cladded layer made of a metal material having a higher hardness than the portion of the surface of the base member that is separated from the hardened layer, on the one surface of the outer circumferential surface, the inner circumferential surface, and side surfaces on both sides in the axial direction of the base member;

a step of forming the rolling element guide surface by finishing the surface of the cladded layer; and a step of forming, by laser hardening, the hardened layer over the entire circumference of the surface layer portion that includes the at least one part of the surface of the base member that is separated from the section covered by the cladded layer.

2. The manufacturing method for a rolling bearing ring according to claim 1, wherein the at least one part is a section of the base member that fits with an adjacent mating member during use, and/or a section that comes in contact with an adjacent mating member during use.

3. A rolling bearing ring, comprising:

a base member including an outer circumferential surface, an inner circumferential surface, and side surfaces on both sides in an axial direction;

a cladded layer that covers one surface of the outer circumferential surface, the inner circumferential surface, and the side surfaces on both sides in the axial direction;

a rolling element guide surface provided over an entire circumference of a surface of the cladded layer, the rolling element guide surface formed by at least a part of the surface of the cladded layer; and a hardened layer formed over the entire circumference of a surface layer portion that includes at least one part of a surface of the base member that is separated from a section covered by the cladded layer;

the base member made of high carbon steel or medium carbon steel;

the cladded layer made of at least one type selected from Fe-based alloy, Ni-based alloy, and Co-based alloy, and having a hardness higher than the portion of the surface of the base member that is separated from the hardened layer and equal or lower than the hardened layer; and the hardened layer having higher hardness than a portion of the surface of the base member that is separated from the hardened layer.

4. The rolling bearing ring according to claim 3, wherein the at least one part is a section of the base member that fits with an adjacent mating member during use, and/or a section that comes in contact with an adjacent mating member during use.

* * * * *